United States Patent Office 2,963,347
Patented Dec. 6, 1960

2,963,347

PRODUCTION OF DIBORANE

Charles C. Clark, Kenmore, and Frank A. Kanda, Fayetteville, N.Y., assignors to Olin Mathieson Chemical Corporation, a corporation of Virginia No Drawing. Filed July 1, 1957, Ser. No. 669,385

2 Claims. (Cl. 23—204)

This invention relates to a method for the production of diborane.

The pyrolysis of diborane to form higher boron hydrides is well known. The operation can be carried out, for example, at a pressure within the range from 0 to 100 p.s.i.g., at a temperature within the range from 150° C. to 300° C. and with a residence time in the pyrolysis zone of from about 1 second to 6 seconds. The diborane pyrolyzed can be in admixture with diluent hydrogen introduced into the pyrolysis zone along with the diborane, the amount of diluent hydrogen being from about 25 to 95 percent by weight, based upon the weight of the diborane. The pyrolysis of the diborane results in the production of tetraborane, pentaborane-9, pentaborane-11, decaborane and so forth. Note, for example, the article by McCarty and Di Giorgio appearing on pages 3138 to 3143 of the July 1951 issue of the Journal of the American Chemical Society.

Frequently, in diborane pyrolysis a yellow solid is formed in addition to the aforementioned borohydrides. This solid is a mixture of polymerized higher boron hydrides higher than decaborane. The solid can be separated from the decaborane with the aid of kerosene, decaborane being more soluble in kerosene than the yellow solid. This is described, for example, in Zaslowsky and Madaus application Serial No. 560,113, filed January 19, 1956. The yellow solid is in general chemically inert and resists efforts to convert it into readily usable chemical compounds. Sometimes, over 50 percent of the end product of the diborane pyrolysis consists of the yellow solid. The boron lost in this by-product adds to the cost of the pyrolysis operation and, of course, lowers the yield of the desired borohydrides, chiefly pentaborane-9 and decaborane. The yellow solid, in addition to representing a loss, also presents a disposal problem inasmuch as it is hazardous to handle.

In accordance with the present invention, a method has been devised whereby the yellow solid just described can be converted to diborane. This is accomplished by heating the yellow solid in contact with hydrogen gas at a temperature of from 800° C. to 1800° C. and recovering diborane from the reaction products. Preferably, the heating is conducted at a temperature within the range from 900° C. to 1500° C. The hydrogen supplied to the reaction zone can be supplied in the form of hydrogen as such, or it can be derived from a hydrocarbon such as methane, ethane, ethylene, propane, propylene, acetylene or mixtures thereof, since such hydrocarbons decompose under the temperature conditions in the reaction zone to produce hydrogen.

The following example illustrates an embodiment falling within the scope of this invention.

Example

A Vycor (fused silica) tube about 1¼ inches in diameter and 8 inches long was arranged vertically with an exit at the top for the gaseous products of the reaction. Inserted into the fused silica tube from the bottom was a graphite cylinder ending about 2 inches below the top of the fused silica tube and extending below it. The graphite cylinder had external diameter of about ¾ inch, an internal diameter of about ½ inch and a wall thickness of ⅛ inch. It was retained in place by a stopper at the bottom and the extended part of the graphite carried a brass water cooling jacket. A tantalum plate about 2 inches below the top of the graphite cylinder and arranged inside the graphite cylinder supported the solid mixture charged to the reaction. The silica tube was surrounded by a water jacket. At the level of the tantalum plate, the water jacket was surrounded by an induction heater, comprising several turns of heavy copper tubing, about ¼ inch in external diameter and cooled internally by a stream of water. The induction heater was supplied with a high frequency current.

The tantalum support was charged with approximately 0.6 gram of yellow solid obtained by the pyrolysis of diborane. This yellow solid was separated from the decaborane produced in the pyrolysis with the aid of kerosene and the kerosene was removed from the yellow solid by washing with pentane. Following the pentane wash, the yellow solid was dried under vacuum to remove the pentane. The yellow solid contained 89.6 weight percent of boron and 7.6 weight percent of hydrogen, 2.7 weight percent carbon being present as an impurity. The yellow solid was heated while hydrogen gas amounting to about 2 liters per minute was passed through the apparatus into contact with the yellow solid. At 900° C. a strong green flame was obtained in the exit gases. The temperature of the yellow solid was gradually raised from 900° C. to 1350° C. over a period of approximately one hour, and the gases issuing from the apparatus were collected in a liquid nitrogen trap and analyzed by means of infrared technique. A total of 0.2 mg. of diborane was collected.

What is claimed is:

1. A method for the production of diborane which comprises pyrolyzing diborane in a first reaction zone under conditions providing products including a mixture of boron hydrides higher then decaborane, separating the mixture of boron hydrides higher than decaborane from the other pyrolysis products, separately reacting the mixture of boron hydrides higher than decaborane in a second reaction zone at a temperature of from 800° C. to 1800° C. with a gas stream consisting essentially of hydrogen, and recovering diborane from the reaction products.

2. The method of claim 1 wherein the reaction is conducted at a temperature within the range from 900° C. to 1500° C.

References Cited in the file of this patent

Stock et al.: "Berichte," vol. 69B, pages 1456–75 (1936).

Burg et al.: "J.A.C.S.," vol. 55, pages 4009–19 (October 1933).

McCarty et al.: "J.A.C.S.," vol. 73, pp. 3138–42 (July 1951).

AD 85727 Armed Services Technical Information Agency, item U 107, page 43, April 1955.

Stock: "Hydrides of Boron and Silicon," pages 87–90, 111, 112.